United States Patent [19]

Foster et al.

[11] 3,975,175

[45] Aug. 17, 1976

[54] PROCESS FOR INCREASING THE STRENGTH OF SEALING GLASS

[75] Inventors: Betty Jane Foster, Wappingers Falls; Perry Robert Langston, Jr., Poughkeepsie; Rao Ramamohana Tummala, Wappingers Falls, all of N.Y.

[73] Assignee: International Business Machines Corporation, Armonk, N.Y.

[22] Filed: June 26, 1975

[21] Appl. No.: 590,651

[52] U.S. Cl. ............................... 65/31; 65/36; 156/3; 156/24
[51] Int. Cl.² ................................... C03C 15/00
[58] Field of Search .............. 156/24, 25, 99, 102, 156/107, 3; 65/31, 36; 252/79.2

[56] References Cited
UNITED STATES PATENTS

| | | | |
|---|---|---|---|
| 2,852,352 | 9/1958 | Landron, Jr. ................. | 252/79.2 |
| 3,023,139 | 2/1962 | Van Tetterode ............... | 156/24 |
| 3,281,294 | 10/1966 | Martin ........................ | 156/24 |
| 3,647,583 | 3/1972 | De Rouw ..................... | 156/24 |
| 3,885,974 | 5/1975 | Asahara et al. ............... | 65/36 |
| 3,898,092 | 8/1975 | Rea ............................ | 156/24 |

Primary Examiner—William A. Powell
Assistant Examiner—Jerome W. Massie
Attorney, Agent, or Firm—David M. Bunnell

[57] ABSTRACT

The strength of high lead or alkaline earth oxide sealing glass articles is increased by treating the surface of the articles with a solution of dilute nitric acid containing about 1–10 weight percent of concentrated nitric acid in water for the time necessary to remove a thin layer of material from the surface of the article.

The purpose of this abstract is to enable the public and the Patent Office to rapidly determine the subject matter of the technical disclosure of the application. This abstract is neither intended to define the invention of the application nor is it intended to be limiting as to the scope thereof.

8 Claims, 2 Drawing Figures

STRENGTH OF SAW-CUT LEAD GLASS
AS AFFECTED BY $HNO_3$ ETCHING

PROCESS FOR INCREASING THE STRENGTH OF SEALING GLASS

BACKGROUND OF THE INVENTION

High lead and baria seal glass articles in suitable shapes such as, rods, billets, or preforms are used in forming seals either to bond parts of a structure together in a gas-tight manner such as, for example, in forming gas display panels or in sealing the outer surface of an article such as a magnetic recording head. The sealing materials have softening points which are low enough so that the temperature which is necessary to form the seal does not cause thermal damage to the parts which are being sealed or bonded. The glasses are a mixture of oxides whose composition is chosen so that they have the proper softening point and co-efficient of thermal expansion to be compatible with the surfaces being sealed. The tensile strength of these glasses is generally in the range of only about 10,000 – 15,000 psi. The sealing glass structures, therefore, must be handled with some care in order to avoid breakage. Also, it has been found that in sealing gas panel structures, in which sealing glass articles are placed between the two parts of the panel where they are subjected to heat and pressure in order to form a gas-tight bond between the parts of the panel, small pieces may separate from the surface of the seal glass preforms during the application of pressure. These pieces usually originate from bumps or seeds caused by the fact that the sealing glass may not be completely homogeneous. When these pieces are ejected from the sealing material into the space between the panel surfaces, they contaminate the structure so that a satisfactory gas panel will not result. There is a need, therefore, to find a way to increase the strength of the sealing glass articles. It has been found that the usual cleaning procedures with, for example, peroxides or etching with hydrofluoric acid, which have been used to improve the strength of some types of glasses, not only fail to improve the tensile strength characteristic of high lead or baria sealing glasses but actually have been found to cause it to deteriorate. Also, hydrofluoric acid treatment results in the formation of a white insoluble residue on the glass which flakes off such that it would be a possible source of contamination.

A process has now been found to substantially increase the tensile strength of sealing glasses.

BRIEF SUMMARY OF THE INVENTION

In accordance with this invention, a process is provided for increasing the strength of a high lead or alkaline earth oxide sealing glass article comprising treating the surface of the article with a solution of dilute nitric acid containing about 1–10 percent by weight of concentrated nitric acid in water. The treatment is carried out for the time necessary to remove a thin layer of material from the surface of the article.

In one aspect of the process of the invention, the process for sealing a surface in which an article of a low softening point high lead or alkaline earth oxide seal glass is placed on the surface and is first heated under mechanical pressure to soften the seal glass and is then cooled so that the glass forms a bond with the surface, is improved by treating the surface of the article with a dilute solution of nitric acid prior to placing the article on the surface so as to increase the tensile strength of the article.

The foregoing and other objects, features and advantages of the invention will be apparent from the following more particular description of the preferred embodiment of the invention, as illustrated in the accompanying drawings.

DETAILED DESCRIPTION

The glasses whose tensile strength can be improved in accordance with the process of the invention are sealing glasses such as high lead glasses and alkaline earth oxide glasses for example, baria glasses. These glasses have relatively low softening points and their composition is chosen in order to provide a softening point which is compatible with the surfaces to be sealed so that thermal damage does not occur to the surfaces during the sealing process. Lead glass compositions comprise lead oxide along with other oxides which are chosen to adjust the hardness, melting point and thermal expansion characteristics of the glass so that it will be compatible with the surfaces being sealed. Such oxides include, for example, $B_2O_3$, $SiO_2$, $ZnO$, $CuO$, $As_2O_3$, $Al_2O_3$, $Na_2O$, and $TiO_2$. The alkaline earth oxide glasses also contain certain of the above oxides but have a predominate portion of, for example, BaO or CaO.

Typical high lead glass compositions would contain in percent by weight PbO 60 to 85, $B_2O_3$ 0 to 20, $SiO_2$ 0 to 10, $Al_2O_3$ 0 to 12, $Bi_2O_3$ 0 to 5, CuO 0 to 10, and ZnO 0 to 20.

Typical alkaline earth oxide glass would contain in percent by weight BaO 20 to 50, $SiO_2$ 20 to 40, $B_2O_3$ 5 to 40, CuO 0 to 10, $Al_2O_3$ 0 to 10, and $As_2O_3$ 0 to 1.

Also within the scope of the glasses whose strength can be improved by the process of the invention are lead-alkaline earth oxide glasses, such as, lead-baria glasses which contain minor amounts of lead (5 to 15 percent, for example).

The sealing glasses are usually used in the form of elongated articles, such as, cylindrical or square rods which are drawn or cut from larger billets. Where, for example, the sealing glass is to be used to seal together two surfaces of facing structures, such as the substrates used to form gas panels, the sealing glass may be formed into a so called preform which has the shape of the seal which is to be formed. For example, where the seal is to be around the edges of a rectangular substrate a unitary rectangular preform can be employed. In the alternative four separate rods could be placed in end-to-end contact at right angles.

When untreated structures of sealing glass are subjected to a three point flexure test in accordance with the general procedure outlined for the flexure test of glass materials (ASTM C158-72) a tensile strength result of about 10,000 – 15,000 psi is typically obtained. For the flexure tests, a square rod 150 mil on a side is employed. The rod is supported on its under side by two thin edges which are 2.1 inches apart. Pressure is applied to the top surface of the rod by means of a thin edge placed in contact with the upper surface of the rod at a point which is half way between the support points. The loading rate is 0.002 inches/minute. In each case a number of samples are used and the average of the results is taken as the measure of tensile strength of the article in pounds per square inch.

Figure 1:
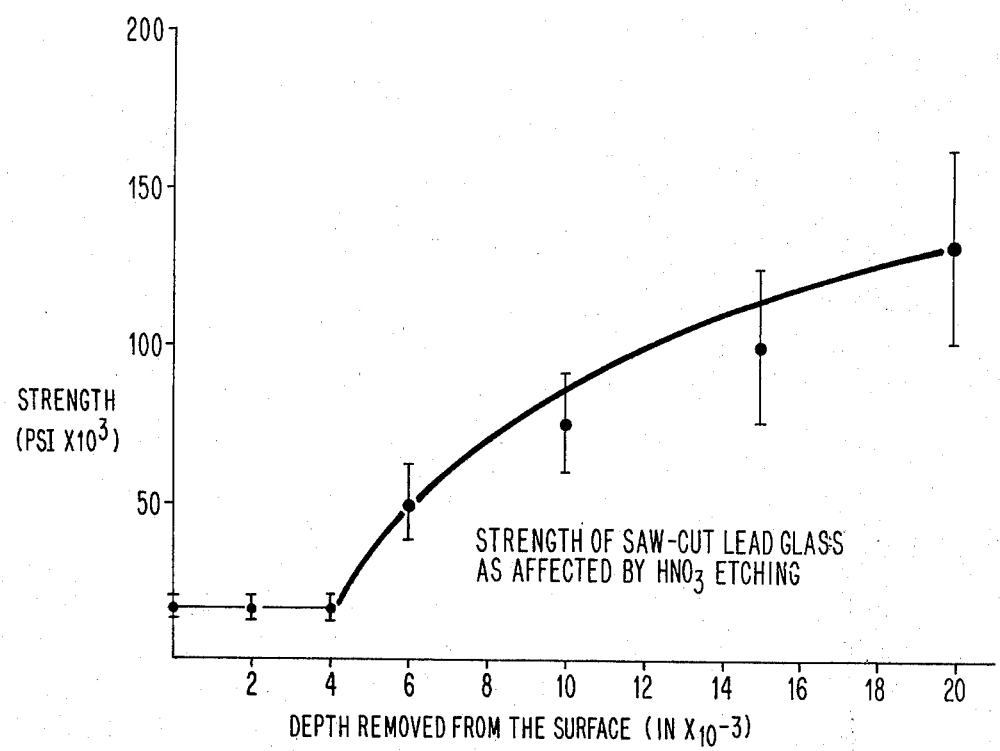
FIG. 1 is a graph showing the strength of a saw-cut lead glass rod plotted against the depth removed from the surface of the rod by a dilute nitric acid treatment in accordance with the process of the invention.
Figure 2:
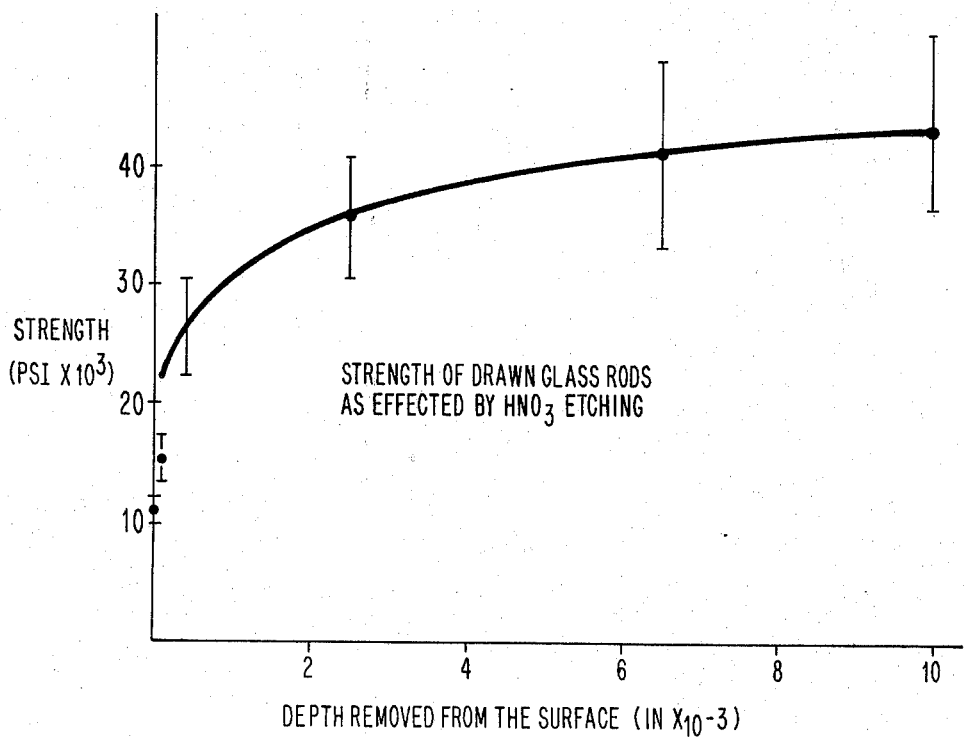
FIG. 2 is a graph showing the strength of a drawn lead glass rod with some defects in the seal rods plotted against the depth of material removed from the surface of the rod by a dilute nitric acid treatment in accordance with the process of the invention.

A dramatic increase in tensile strength from about 10,000 pounds per square inch up to as high as 175,000 pounds per square inch is obtained by etching the surface of the sealing glass articles with dilute nitric acid. Aqueous nitric acid solutions containing from about 1 to 10% by weight of concentrated nitric acid (16 normal) in deionized water can be used. The time of immersion should be sufficient to remove a thin layer of material from the surface of the articles. As illustrated in FIG. 1 and FIG. 2, after a given amount of surface material is removed, the strength increases rapidly at first and then levels off. The vertical lines in the graph are the spread of the test results and the data points are shown as the average of the results. The rods used to obtain the data shown in FIG. 2 were of a lead glass and had visible defects and the improvement was to about the 40,000 psi range. Some improvement resulted from removing about 0.1 mil from the surface. As shown in FIG. 1, where lead glass rods with no visible defects were etched, the improvement was observed to occur after about 4 mils of surface material were removed. From these results, it appears that the degree of etching or removal of material from the article to achieve optimum results will depend upon the nature of the sample being treated. Generally, the removal of a depth of from about 4 to about 20 mils gives substantial improvement in the tensile strength. It has also been noted that the effects of exposure of the treated articles to the ambient atmosphere will cause the tensile strength to decrease with time. Accordingly, the treated articles should be protected from the effects of carbon dioxide and water vapor if they are to be stored for any length of time prior to use. In the alternative, they should be used within a few hours of treatment.

Following the acid treatment, which is conveniently carried out by immersing the articles in the acid bath, the articles are rinsed with ammonium hydroxide and isopropyl alcohol or with deionized water, isopropyl alcohol and Freon fluorinated hydrocarbon. Other conventional liquid-solid contacting techniques such as by spraying can also be used to treat the articles.

In order to further illustrate the process of the invention, various lead, lead and baria, and baria glasses were treated and subjected to flexure testing as illustrated in the following examples.

EXAMPLE 1

Samples of saw-cut high lead glass having a 150 mil on the side square cross-section and a length of about 3.0 inches were treated for varying lengths of time by immersion in a dilute nitric acid solution containing 5% by weight of reagent grade concentrated nitric acid (16 normal) in 95% by weight of deionized water. The composition of the glass in weight percent was; PbO 66.0, $B_2O_3$ 14.0, $SiO_2$ 2.0, $Al_2O_3$ 3.5, ZnO 10.5, CuO 2.5 and $Bi_2O_3$ 1.5. 40 samples of the rods were etched for different times ranging from 1 to 20 minutes to remove different amounts of material from the surface of the rods, these amounts were as shown in FIG. 1 about 2, 4, 6, 10, 15, and 20 mils, respectively. The rods were removed from the solution, washed with deionized water, air dried and then subjected to the 3 point flexure test in accordance with ASTM process C158. As FIG. 1 shows, control samples and the samples etched to a depth of 2 and 4 mils respectively showed no substantial improvement in the initial tensile strength of about 15,000 psi. After 4 mils were removed a rapid increase in tensile strength resulted which reached about 130,000 psi after 20 mils of material had been removed.

The results in FIG. 2 resulted from the treatment of drawn glass rods of the composition of Example 1 having a square cross-section 40 mils on a side in which the rods had visible crystalline seeds or defects. Such rods would be expected to be very brittle and difficult to successfully use for the sealing of gas panels. As shown from the data in FIG. 2 the untreated rods had a tensile strength of about 11,000 psi but treatment in the nitric acid bath caused measurable improvement in the tensile strength even when only about one tenth of a mil of material had been removed from the surface. Again, as in the case of the saw-cut rods the improvement in strength began to level off as the depth removed from the surface increased.

Treated saw-cut rods which were immersed for 5 minutes in 5% dilute nitric acid were placed between the surfaces of gas panel glass substrates and heated to the softening point of the glass with about 7 pounds per square inch of mechanical pressure being applied to the seal at a temperature of about 480°C. The structure was cooled below the softening point of the seal glass and clear, defect-free seals for a satisfactory gas panel structure were obtained.

EXAMPLE 2

In order to illustrate the benefits achievable by the process of the invention with other glass compositions the process of Example 1 was repeated with four other glass compositions as shown in Table I below including two lead-baria glasses, a lead-free, high baria glass, and a high lead glass.

TABLE I

| Glass Composition Percent by Weight | | | | | | | | | | | |
|---|---|---|---|---|---|---|---|---|---|---|---|
| Sample | PbO | $B_2O_3$ | $SiO_2$ | $Al_2O_3$ | ZnO | CuO | $Bi_2O_3$ | BaO | CaO | $As_2O_3$ | Glass Type |
| 1 | 13.9 | 23.3 | 18.6 | 5.9 | — | — | — | 34.5 | 3.6 | 0.2 | Lead-Baria Glass |
| 2 | 5.8 | 25.0 | 44.8 | 3.2 | — | — | — | 15.0 | 6.0 | 0.2 | Lead-Baria Glass |
| 3 | — | 9.3 | 34.1 | 6.3 | — | — | — | 41.8 | 7.9 | 0.5 | High Baria Glass |
| 4 | 73.4 | 6.3 | 15.2 | 5.1 | — | — | — | — | — | — | High Lead Glass |

The samples were 60 to 100 mils in cross section and were immersed in a dilute nitric acid bath containing 5 weight percent concentrated nitric acid in deionized water for 5 minutes after which the tensile strengths of the glass samples were determined by the flexure test. Glass 1, the lead-baria glass, gave a tensile strength result of about 78,000 psi. Glass 2, the other lead-baria glass gave a tensile strength result of about 55,000 psi. The high baria lead-free glass, glass 3, gave a result of 80,000 psi and the high lead, non-copper glass, gave a tensile strength result of 118,000 psi. Control samples of each glass, which had not been etched in dilute nitric acid, gave tensile strengths in the range of about 10,000 to 15,000 psi.

EXAMPLE 3

In order to illustrate the effect of hydrofluoric acid etching when employed with sealing glasses, samples of the saw-cut lead glass of Example 1 were subjected to a buffered hydrofluoric acid etch (7:1 water to HF) for 5 minutes so as to remove about 5 mils of material from the surface. After removing the lead glass rods from the solution and rinsing in deionized water, a white deposit on the surface of the glass was noted. When samples were subjected to the flexure test it was found that the tensile strength actually had deteriorated from about 10,000 pounds per square inch for the untreated samples down to about 7,000 pounds per square inch for the treated samples. It was noted that the white insoluble residue easily flaked off the glass making it apparent that the rods would probably cause contamination of any gas panel structure which they were used to seal.

While the invention has been particularly shown and described with reference to preferred embodiments thereof, it will be understood by those skilled in the art the various changes in form and details may be made therein without departing from the spirit and scope of the invention.

We claim:

1. A process for increasing the strength of a high lead or alkaline earth oxide sealing glass article which has a homogeneous composition, the process consisting essentially of etching the surface of said article with a solution of dilute nitric acid containing from about 1 to about 10 weight percent of concentrated nitric acid in water for the time necessary to remove a thin layer of at least about 0.1 mil in thickness from the surface of said article so as to increase the tensile strength of said article.

2. The process of claim 1 wherein said article is a sealing rod or billet.

3. The process of claim 1 wherein said solution contains about 5 weight percent of concentrated nitric acid and the article is immersed in a bath of said solution for from about 1 to 5 minutes.

4. The process of claim 1 wherein the article is immersed in said bath for a sufficient time to remove a layer of least about 1 mil from the surface of said article.

5. The process of claim 4 wherein the article is immersed in said bath for a sufficient time to remove a layer of from about 4 to about 20 mils from the surface of said article.

6. The process of claim 1 wherein the article is a sealing glass preform.

7. In a process for sealing a surface, in which an article of a low softening point high lead or alkaline earth oxide seal glass having a homogeneous composition is placed on said surface and is heated under mechanical pressure to soften the glass and is then cooled so that the glass forms a bond with said surface, the improvement which consists essentially of etching the surface of the article with a dilute solution of nitric acid, so as to remove a thin layer of from about 0.1 to 20 mils in thickness from the surface of the article prior to placing the article on said surface so as to increase the tensile strength of said article.

8. The process of claim 7 wherein said treated article is placed between two surfaces so that under heat and pressure the article bonds the surfaces to form a gas tight chamber between said surfaces.

* * * * *